US008639692B2

(12) United States Patent
Chen et al.

(10) Patent No.: US 8,639,692 B2
(45) Date of Patent: Jan. 28, 2014

(54) HIGH-DIMENSIONAL STRATIFIED SAMPLING

(75) Inventors: Aiyou Chen, New Providence, NJ (US); Ming Xiong, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 418 days.

(21) Appl. No.: 12/824,849

(22) Filed: Jun. 28, 2010

(65) Prior Publication Data
US 2011/0320447 A1    Dec. 29, 2011

(51) Int. Cl.
*G06F 7/00*    (2006.01)
(52) U.S. Cl.
USPC .......................................... 707/736; 707/738
(58) Field of Classification Search
None
See application file for complete search history.

(56) References Cited

U.S. PATENT DOCUMENTS

| | | | |
|---|---|---|---|
| 4,472,784 A * | 9/1984 | Blachman | 702/83 |
| 6,519,604 B1 * | 2/2003 | Acharya et al. | 707/738 |
| 6,564,221 B1 * | 5/2003 | Shatdal | 1/1 |
| 6,889,221 B1 * | 5/2005 | Luo et al. | 1/1 |
| 6,937,994 B1 * | 8/2005 | Iyengar | 705/7.29 |
| 8,010,538 B2 * | 8/2011 | Pedersen | 707/749 |
| 2002/0198863 A1 * | 12/2002 | Anjur et al. | 707/1 |
| 2005/0049990 A1 | 3/2005 | Milenova et al. | |
| 2007/0174335 A1 * | 7/2007 | Konig et al. | 707/104.1 |
| 2008/0154541 A1 | 6/2008 | Gemulla et al. | |
| 2009/0037651 A1 * | 2/2009 | Gorobets | 711/103 |

FOREIGN PATENT DOCUMENTS

WO  PCTUS2011039750   11/2011

OTHER PUBLICATIONS

C.T. Fan et al., "Development of Sampling Plans by Using Sequential (Item by Item) Selection Techniques and Digital Computers," Journal of the American Statistical Association, Jun. 1962, pp. 387-402, vol. 57, No. 298.
S. Joshi et al., "Robust Stratified Sampling Plans for Low Selectivity Queries," IEEE International Conference on Data Engineering, Apr. 2008, pp. 199-208.
F. Olken et al., "Maintenance of Materialized Views of Sampling Queries," IEEE International Conference on Data Engineering, 1992, pp. 632-641.
S.K. Thompson, "Stratified Sampling," Jan. 2002, pp. 117-127, Chapter 11, XP-002451747.
D. Barbara et al., "The New Jersey Data Reduction Report," IEEE Computer Society, Bulletin of the Technical Committee on Data Engineering, Dec. 1997, pp. 3-45, vol. 20, No. 4.

(Continued)

*Primary Examiner* — Fred I Ehichioya
*Assistant Examiner* — Hasanul Mobin
(74) *Attorney, Agent, or Firm* — Ryan, Mason & Lewis, LLP

(57) ABSTRACT

In one aspect, a processing device of an information processing system is operative to perform high-dimensional stratified sampling of a database comprising a plurality of records arranged in overlapping sub-groups. For a given record, the processing device determines which of the sub-groups the given record is associated with, and for each of the sub-groups associated with the given record, checks if a sampling rate of the sub-group is less than a specified sampling rate. If the sampling rate of each of the sub-groups is less than the specified sampling rate, the processing device samples the given record, and otherwise does not sample the given record. The determine, check and sample operations are repeated for additional records, and samples resulting from the sample operations are processed to generate information characterizing the database. Other aspects of the invention relate to determining which records to sample through iterative optimization of an objective function that may be based, for example, on a likelihood function of the sampled records.

16 Claims, 6 Drawing Sheets

(56) References Cited

OTHER PUBLICATIONS

S. Chaudhuri et al., "Optimized Stratified Sampling for Approximate Query Processing," ACM Transaction on Database Systems, Jun. 2007, pp. 1-50, vol. 32, No. 2, Article 9.

M-S. Chen et al., "Data Mining: An Overview from a Database Perspective," IEEE Transactions on Knowledge and Data Engineering, Dec. 1996, pp. 866-883, vol. 8, No. 6.

A. Cuzzocrea et al., "LCS-Hist: Taming Massive High-Dimensional Data Cube Compression," Proceedings of the 12th International Conference on Extending Database Technology: Advances in Database Technology, Mar. 2009, pp. 768,779, Saint Petersburg, Russia.

Rainer Gemulla, "Sampling Algorithms for Evolving Datasets," Ph.D. Thesis, Oct. 2008, 281 pages.

P.B. Gibbons et al., "Fast Incremental Maintenance of Approximate Histograms," ACM Transactions on Database Systems, 2002, pp. 261-298, vol. 27, No. 3.

A.C. Gilbert et al., "Fast, Small-Space Algorithms for Approximate Histogram Maintenance," STOC, May 2002, pp. 389-398, Montreal, Quebec, Canada.

C. Jermaine et al., "Online Maintenance of Very Large Random Samples," ACM SIGMOD, Jun. 2004, pp. 299-310, Paris, France.

S.D. Lee et al., "Is Sampling Useful in Data Mining? A Case in the Maintenance of Discovered Association Rules," Data Mining and Knowledge Discovery, 1998, pp. 233-262, vol. 2, No. 3.

S. Nath et al., "Online maintenance of Very Large Random Samples on Flash Storage," VLDB Journal, Aug. 2008, pp. 14, Auckland, New Zealand.

* cited by examiner

FIG. 5

| CONN RECORDS | START TIME | END TIME | TYPE | FCA | STRONGEST PILOT | ... |
|---|---|---|---|---|---|---|
| 1 | 05/10/2009 03:20:10 | 05/20/2009 03:20:10 | SESSION SETUP | 0 | −3 dB | |
| 2 | 05/10/2009 03:20:12 | 05/10/2009 03:20:13 | SESSION SETUP | 1 | −9 dB | |
| 3 | 05/10/2009 03:20:15 | 05/10/2009 03:21:20 | USER INITIAL | 0 | −1 dB | |

HIGH-DIMENSIONAL STRATIFIED SAMPLING

FIELD OF THE INVENTION

The present invention relates generally to the field of information processing, and more particularly relates to techniques for stratified sampling of records associated with a database of an information processing system.

BACKGROUND OF THE INVENTION

Large databases often include millions of records or more, with each record having many attributes. Statistical operations may be performed on such databases using sampling techniques that generally involve selecting records at random from the database. The selected records may then be analyzed to generate statistics characterizing the complete set of records in the database. In order to ensure that the resulting statistics accurately characterize the database, stratified sampling techniques may be used. In stratified sampling, the database records are separated into sub-groups or "strata," and one or more records are then randomly selected from each of the sub-groups for analysis. An example of a conventional stratified sampling technique is described in U.S. Patent Application Publication No. 2002/0198863, entitled "Stratified Sampling of Data in a Database System."

A problem with conventional stratified sampling techniques is that such techniques typically attempt to separate the records into mutually exclusive sub-groups, and can therefore only consider a limited number of attributes. The number of attributes per record is generally referred to as the "dimensionality" of the database, and the conventional stratified sampling techniques are practical only in low dimensionality situations. However, many modern databases, such as those used to track connection data in telecommunication applications, have a very high dimensionality.

Consider by way of example a database that stores N records, each with K attributes, where each attribute takes $m_k$ discrete values, $1 \leq k \leq K$. If K is small, one can simply concatenate the attributes in order to partition the database into mutually exclusive sub-groups. The number of sub-groups in this case is given by $\Pi_{k=1}^{K} m_k$. However, as K gets larger, this approach is impractical. For example, if $m_k=5$ and $K=10$, then there are nearly $10^7$ sub-groups, many of which will contain no records or only a small number of records. In this type of high dimensionality context, conventional stratified sampling techniques are unable to provide an appropriate stratified sample for each of the K attributes. The problem is apparent in numerous information processing applications, including large scale database integration and maintenance, data mining, data warehousing, query processing, telecommunication network traffic analysis, opinion polls, etc.

SUMMARY OF THE INVENTION

Illustrative embodiments of the present invention provide high-dimensional stratified sampling techniques that are suitable for use in applications in which both the number N of records and the number K of attributes per record are large. These embodiments include sequential and optimal high-dimensional stratified sampling algorithms. The former is particularly useful for online sampling, while the latter is particularly useful for offline or periodical sampling, although both can also be used in a wide variety of other sampling applications.

In accordance with one aspect of the invention, a processing device of an information processing system is operative to perform high-dimensional stratified sampling of a database comprising a plurality of records arranged in overlapping sub-groups. For a given record, the processing device determines which of the sub-groups the given record is associated with, and for each of the sub-groups associated with the given record, checks if a sampling rate of the sub-group is less than a specified sampling rate. If the sampling rate of each of the sub-groups is less than the specified sampling rate, the processing device samples the given record, and otherwise does not sample the given record. The determine, check and sample operations are repeated for additional records, and samples resulting from the sample operations are processed to generate information characterizing the database.

In accordance with another aspect of the invention, a processing device of an information processing system performs high-dimensional stratified sampling of a database comprising a plurality of records arranged in overlapping sub-groups by optimizing an objective function characterizing which of the plurality of records are to be sampled. The objective function may be based, for example, on a likelihood function of the sampled records, and more specifically may be based on a binomial-normal approximation of a likelihood function of the sampled records. The optimization of the objective function is performed by iteratively updating components of a binary indicator that specifies whether or not respective ones of the plurality of records are sampled. The processing device samples particular ones of the plurality of records based on values of the updated components of the binary indicator which optimize the objective function, and the resulting samples are processed to generate information characterizing the database comprising the sub-groups of records.

The illustrative embodiments provide significant advantages over conventional approaches. For example, the sequential and optimal high-dimensional stratified sampling processes in the illustrative embodiments can be used to generate reliable, unbiased samples with minimal computing and memory requirements.

These and other features and advantages of the present invention will become more apparent from the accompanying drawings and the following detailed description.

BRIEF DESCRIPTION OF THE DRAWINGS

FIG. 5 shows a simple example of a set of connection records in a network traffic application in which the high-dimensional stratified sampling processes of FIG. 3 or 4 may be applied.

DETAILED DESCRIPTION OF THE INVENTION

The present invention will be illustrated herein in conjunction with exemplary information processing systems, processing devices and high-dimensional stratified sampling techniques. It should be understood, however, that the invention is not limited to use with the particular types of systems, devices and techniques disclosed. For example, aspects of the present invention can be implemented in a wide variety of other information processing system configurations, using processing devices and process steps other than those described in conjunction with the illustrative embodiments.

Figure 1:
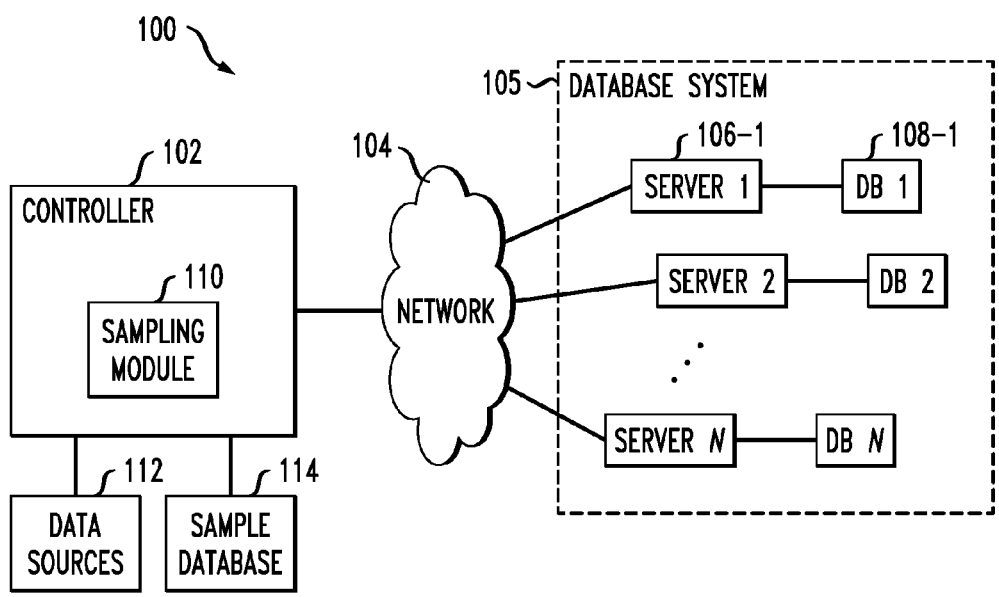
FIG. 1 is a block diagram of an information processing system implementing high-dimensional stratified sampling in an illustrative embodiment of the invention.

FIG. 1 shows an information processing system 100 comprising a controller 102 coupled via a network 104 to a database system 105 that includes a plurality of servers 106-1, 106-2, ... 106-N, also denoted Server 1, Server 2, ... Server N. Each of the servers 106 has an associated database 108. These databases store records or other data objects that are accessed by the controller 102 via the network 104. The controller 102 in this embodiment comprises a sampling module 110 that is configured to implement one or more high-dimensional stratified sampling techniques to be described in greater detail below. The sampling module 110 utilizes the high-dimensional stratified sampling technique(s) to process sets of records that are separated into sub-groups that are not necessarily mutually exclusive. The records processed by the sampling module 110 may be received from data sources 112 or retrieved from one or more of the databases 108 of the database system 105. The resulting stratified samples may be stored by the controller 102 in a sample database 114. Although shown in the figure as being separate from the database system 105, system elements such as controller 102 and sample database 114 may alternatively be implemented within the database system 105.

The controller 102 may comprise at least a portion of a computer or any other type of processing device suitable for communicating with the database system 105 over network 104. For example, the controller may comprise a portable or laptop computer, mobile telephone, personal digital assistant (PDA), wireless email device, television set-top box (STB), or other communication device.

The network 104 may comprise a wide area network such as the Internet, a metropolitan area network, a local area network, a cable network, a telephone network, a satellite network, as well as portions or combinations of these or other networks.

In other embodiments, the sampling module 110 may be implemented in one or more of the servers 106 or their associated databases 108, or in a separate centralized controller coupled to one or more of these elements. It is also possible to implement the sampling module in a distributed manner with portions of the module being arranged in respective ones of the devices 102, 106 or 108 or subsets thereof.

The databases 108 need not be in any particular configuration, and the term "database" as used herein is therefore intended to be construed broadly so as to encompass any number of different arrangements of stored records.

Figure 2:
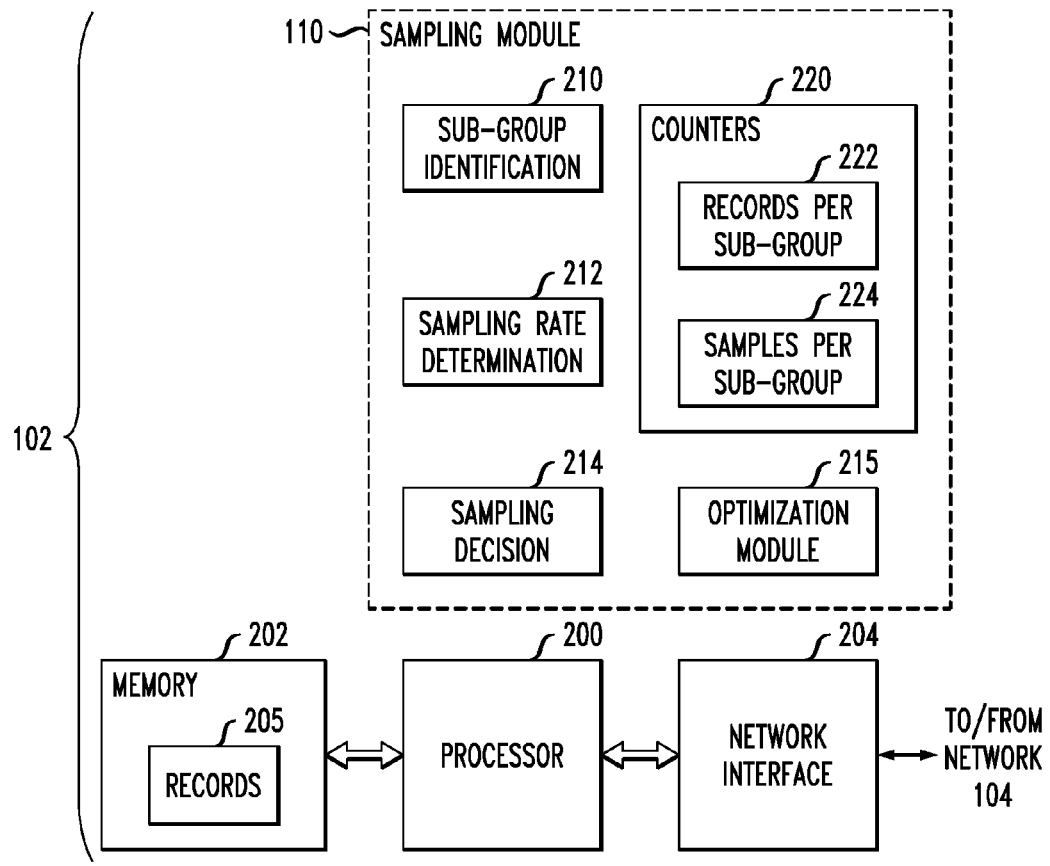
FIG. 2 shows a more detailed view of a processing device of the FIG. 1 system.

Referring now to FIG. 2, one possible implementation of the controller 102 of the system 100 is shown. In this embodiment, the controller comprises a processor 200 coupled to a memory 202, and further comprises network interface circuitry 204. The memory 202 is assumed to store records 205 or portions thereof for processing by the sampling module 110. The stored records 205 may be received from data sources 112 or retrieved from the database system 105 over the network 104. The sampling module 110 of the controller 102 in this implementation comprises a sub-group identification module 210, a sampling rate determination module 212, a sampling decision module 214, an optimization module 215, and a set of counters 220 including counters 222 that count the number of records per sub-group and counters 224 that count the number of samples per sub-group. The operation of these modules and counters will be described in greater detail below in conjunction with FIGS. 3 and 4.

The processor 200 may be implemented as a microprocessor, a microcontroller, an application-specific integrated circuit (ASIC) or other type of processing device, as well as portions or combinations of such devices. The memory 202 may comprise an electronic random access memory (RAM), a read-only memory (ROM), a disk-based memory, or other type of storage device, as well as portions or combinations of such devices. The processor and memory may be used in storage and execution of one or more software programs for high-dimensional stratified sampling, as well as for performing related operations, such as those associated with storage and processing of records. The modules 210, 212, 214 and 215 may therefore be implemented at least in part using such software programs. The memory 202 may be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 200, memory 202 and interface circuitry 204 may comprise well-known conventional circuitry suitably modified to operate in the manner described herein. Also, the various modules shown in FIG. 2 may be viewed as examples of circuitry used to implement the associated functionality. For example, portions of such circuitry may comprise matrix multiplication circuitry or other types of arithmetic logic circuitry. Conventional aspects of such circuitry are well known to those skilled in the art and therefore will not be described in detail herein.

It is to be appreciated that an information processing system and associated controller as disclosed herein may be implemented using components and modules other than those specifically shown in the exemplary arrangements of FIGS. 1 and 2.

The operation of the system 100 in illustrative embodiments will now be described with reference to the flow diagrams of FIGS. 3 and 4. These flow diagrams illustrate respective sequential and optimal high-dimensional stratified sampling techniques. It will be assumed for these embodiments that the sampling techniques are applied to a database that stores N records, each with K attributes, where each attribute takes $m_k$ discrete values, $1 \leq k \leq K$. This sampled database may comprise, for example, one or more of the databases 108 in the database system 105, or the entire database system 105. It should be noted that N in this context refers to the total number of stored records, and not to the number of servers 106 and databases 108 as in the context of FIG. 1.

The sub-groups are generally pre-defined by the categories of the fields of interest and their combinations. In portions of the description below, we assume without limitation that each sub-group of records takes a particular one of the $m_k$ discrete values or categorical values (in the case of a continuous attribute, one can discretize or categorize them into $m_k$ values) for one attribute, such that there are a total of $J = \Sigma_{k=1}^{K} m_k$ sub-groups or strata. Accordingly, the sub-groups may have many overlapping records in these embodiments. This is in contrast to conventional stratified sampling which, as indicated previously, separates records into mutually exclusive sub-groups. It should be noted that J can be very large for large scale complex databases.

Also, the number of sub-groups J can be larger than the $\Sigma_{k=1}^{K} m_k$ sub-groups that result under the above-noted assumption of each sub-group taking a particular one of the $m_k$ discrete or categorical values for one attribute. For example, one can define sub-groups by taking combinations of more than one attribute. Such combinations of multiple attributes can be important in many typical practical applications. Therefore, J can be larger than $\Sigma_{k=1}^{K} m_k$ but much smaller than $\Pi_{k=1}^{K} m_k$.

The relationship between the records and the sub-groups can be formulated as follows. Let A be an N×J binary matrix, where $A_{ij}$ indicates whether or not the ith record is part of the jth sub-group, i=1, . . . , N, j=1, . . . , J. For simplicity, we assume that each record belongs to at least one sub-group, thus each row of A must contain at least one 1. Let $c \in \{0,1\}^N$ with $\Sigma_{i=1}^{N} c_i = n$, where n is the number of records to be sampled and N is the number of records to sample from, such that $c_i$ indicates whether the ith record is sampled. Let $$n_j = \sum_{i=1}^{N} A_{ij}$$

$$s_j = \sum_{i=1}^{N} c_i A_{ij}$$

be the number of records and number of sampled records for the jth sub-group, respectively. Since J can be large, the objective of high-dimensional stratified sampling in this context can be characterized as choosing c such that $s_j \approx n_j p$ for j=1, . . . , J. As indicated previously, two different techniques for high-dimensional stratified sampling are referred to herein as sequential and optimal high-dimensional stratified sampling, and are described in conjunction with FIGS. 3 and 4, respectively.

It is important to note that the above-described N×J binary matrix A is typically very sparse, and thus A can stored within a compact memory space. Also, computation that takes advantage of the sparsity of A can be done efficiently using sparse matrix operations which are well known to those skilled in the art.

Figure 3:
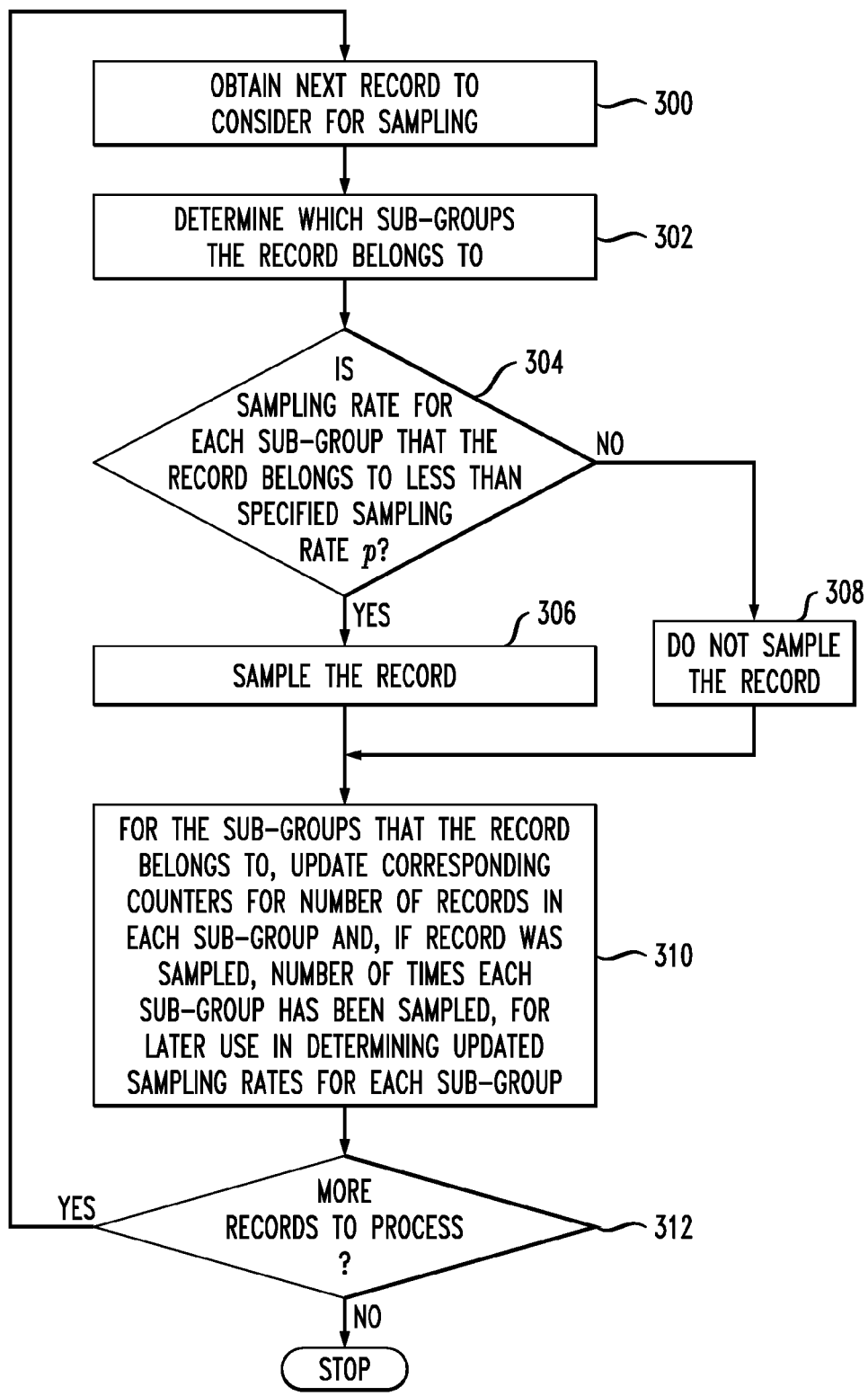
FIG. 3 is a flow diagram of a sequential high-dimensional stratified sampling process in an illustrative embodiment of the invention.
Figure 4:
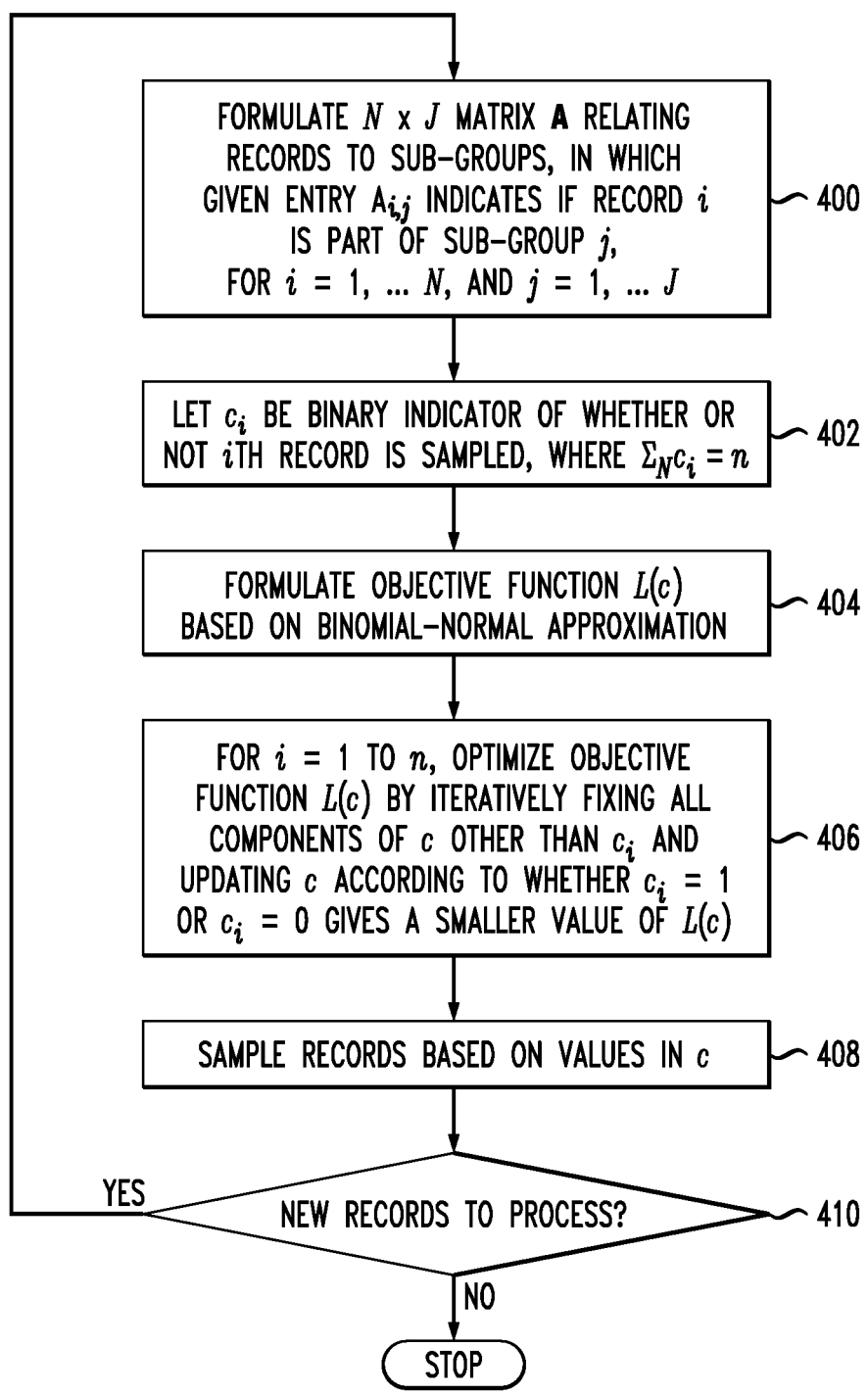
FIG. 4 is a flow diagram of an optimal high-dimensional stratified sampling process in an illustrative embodiment of the invention.

A simple example of a set of connection records in a network traffic application in which the high-dimensional stratified sampling processes of FIG. 3 or 4 may be applied is shown in FIG. 5. In this example, three connection records are shown, each including fields for start time, end time, connection type, failed call attempt (FCA) and strongest pilot. It is to be appreciated, however, that the techniques disclosed herein can be applied to records of any type and do not require the use of any particular record format. The term "record" as used herein is therefore intended to be construed broadly, so as to encompass numerous different arrangements of stored data or other data objects.

Referring now to FIG. 3, a flow diagram is shown illustrating a sequential high-dimensional stratified sampling process that is implemented in the system 100 of FIG. 1. The sampling process in this embodiment generally involves processing records sequentially, for example, as such records are received from data sources 112. This is a type of "online" sampling in that the records may be sampled in real time in a sequential manner as each new record becomes available. The process includes steps 300 through 312 as shown.

In step 300, the next record to be considered for sampling is obtained. As indicated previously, this record may be a new record that is received from one of the data sources 112 for storage in one of the databases 108. In some embodiments, the order in which records are considered for sampling may be randomly permuted, so as to ensure that sampling is not biased by factors such as local storage structure.

In step 302, a determination is made regarding which of the J sub-groups this particular record belongs to. The sub-groups are assumed in this embodiment to be predetermined in the manner described above. In other embodiments, sub-groups may be determined using techniques such as association rule mining algorithms.

In step 304, a determination is made as to whether or not the sampling rate for each sub-group that the record belongs to is less than a specified sampling rate p. The sampling rate is determined for a given sub-group using a corresponding one of the records per sub-group counters 222 and a corresponding one of the samples per sub-group counters 224. The records per sub-group counter gives a measure of the size of the sub-group in terms of the number of records that are part of that sub-group. The samples per sub-group counter gives a measure of the number of times that the sub-group has been sampled. The sampling rate for the sub-group is determined as the number of times the sub-group has been sampled, divided by the number of records that are part of the sub-group. This sampling rate is determined separately for each of the sub-groups that includes the record being considered for sampling.

If the sampling rate for each sub-group that the record belongs to is less than the specified sampling rate p, the record is sampled as indicated in step 306. Otherwise, the record is not sampled, as indicated in step 308. Thus, a given record under consideration is sampled if and only if for each of the sub-groups the record belongs to, the realized sampling rate is bounded above by the specified sampling rate p.

The process then moves to step 310 to update the appropriate counters for the sub-groups that the sampled or unsampled record belongs to. The updated counters are then used later in the next iteration of the process as applied to the next record to be considered for sampling. If the record was sampled in step 306, for each of the sub-groups that the record belongs to, the corresponding one of the counters 222 of records per sub-group and the corresponding one of the counters 224 of samples per sub-group are updated. However, if the record under consideration was not sampled, such that the process arrives at step 310 via step 308, it is only necessary to update the records per sub-group counter, as the number of samples per sub-group will be unchanged.

In step 312, a determination is made as to whether or not there are additional records to process. If there are additional records, the process returns to step 300 to obtain the next record to consider for sampling. Otherwise, the process ends as indicated.

Once appropriate samples of a given set of records have been generated using the FIG. 3 process, the samples may be stored in the sample database 114 or elsewhere in the system 100, and used to perform regression analysis, data mining or other functions. More generally, results of the sample operations are further processed to generate information characterizing a database that includes the sub-groups of records.

Referring now to FIG. 4, a flow diagram is shown illustrating an optimal high-dimensional stratified sampling process that is implemented in the system 100 of FIG. 1. The sampling process in this embodiment generally involves processing records in groups, for example, as retrieved from one or more of the databases 108, or as received from one or more of the data sources 112. This may be viewed as a type of "offline" or periodic sampling, as the records are not processed sequentially as in the FIG. 3 embodiment. The process includes steps 400 through 410 as shown.

In the optimal sampling process, optimization of an objective function leads to the desired sampling solution. One possible objective function is to minimize $\Sigma_j^J(s_j-n_j p)^2$ as a function of c. This is a quadratic norm, which tends to ignore strata with small $n_j$ and is therefore not desirable in certain applications. Another possibility is to minimize relative errors $$\sum_{j=1}^{J}\left(\frac{s_j - n_j p}{n_j}\right)^2,$$

which focuses more on small strata. However, as an alternative to these two possible objective functions, we will describe below an objective function that makes a good trade-off between both large strata and small strata. Note that the sample size $s_j$ for each sub-group follows a binomial distribution as before. By treating each sub-group independently, we can express a binomial objective function given by the likelihood function of the samples as follows:

$$\prod_{j=1}^{J}\binom{n_j}{s_j} p^{s_j}(1-p)^{n_j-s_j}$$

where $n_j$ is the size of the jth sub-group. Note that the independence assumption on the sub-groups does not mean that the sub-groups are non-overlapped. Instead, it simply implies that each sub-group can involve an arbitrary subset of the records, independent of what records are associated with other sub-groups. Therefore, it implicitly assumes random overlapping among the records associated with different sub-groups. Maximization of the likelihood function will lead to a solution regarding which records are to be sampled.

Based on the binomial-normal approximation, i.e., $s_j$ follows approximately a normal distribution $\mathcal{N}(n_j p, n_j p(1-p))$, the corresponding normal objective function can be formulated as follows:

$$L(c) = \sum_j \frac{(s_j - n_j p)^2}{n_j p(1-p)}$$

which is the logarithmic likelihood function (up to a constant) of $\{s_j:1\leq j\leq J\}$ based on the normal approximation. Note that there are two major differences between the binomial and normal objective functions. First, the normal objective function is a weighted square sum, where the relative estimation error is defined by $n_i^{-1}|s_j p^{-1}-n_i|$, for the sub-groups weighted by their sizes that downgrade small sub-groups. Therefore, it is more intuitive than the binomial objective function. A small value of L(c) implies small relative estimation errors. Second, since $s_j=A_j^T c$, where $c\in\{0,1\}^n$ is a binary vector, the unknown parameter, indicating whether a $s_i$ record is sampled or not, the normal objective function is a quadratic form of c, which makes optimization of the normal objective function simpler than in the binomial case. Due to these advantages, the FIG. 4 embodiment utilizes the normal objective function L(c). The quadratic form of L(c) can be written as $$L(c) = \sum_j \frac{(A_j^T c - n_j p)^2}{n_j p(1-p)}.$$

Minimization of L(c) with respect to c then leads to a sampling solution, which we refer to herein as optimized sampling.

It should be noted that terms such as "optimal" and "optimization" as used herein do not require the achievement of any particular absolute minimum or absolute maximum, but are instead intended to be construed broadly to encompass, for example, achievement of minimum or maximum values within specified bounds or subject to specified residual error.

In step 400 of the FIG. 4 sampling process, the previously-described N×J binary matrix A is formulated, where $A_{ij}$ indicates whether or not the ith record is part of the jth sub-group, i=1, ..., N, j=1, ..., J. Again, it is assumed that each record belongs to at least one sub-group, thus each row of A must contain at least one 1.

In step 402, $c_i$ is designated as a binary indicator of whether the ith record is sampled. As noted above, $c\in\{0,1\}^N$ with $\Sigma_{i=1}^N c_i=n$.

In step 404, the normal objective function L(c) described above is formulated, based on the binomial-normal approximation as previously described.

In step 406, the objection function L(c) is optimized, and more specifically minimized with respect to c, to provide the desired sampling solution. This particular minimization problem is a type of binary quadratic optimization problem, which is typically NP hard. Known algorithms for solving such optimization problems include simulated annealing and taboo search, but can be very time-consuming. The optimization implemented in step 406 instead utilizes an iterative process that, for i=1, ..., n, fixes all components of c except $c_i$ and updates $c_i$ according to whether $c_i=1$ or $c_i=0$ gives a smaller value of L(c). The iteration steps converge to a local solution as the objective function decreases monotonically. The local convergence can be achieved quickly, i.e., each $c_i$ will typically only need to be updated a few time, which does not cause much computational burden. It should be noted that the high dimensional sequential sampling process of FIG. 3, or conventional random sampling, can be applied to the group of records to provide a good initialization point of c for minimizing L(c). One can also use alternative techniques such as spectral approximation to obtain an initial value of c.

In step 408, the records are sampled based on the values in c as determined in the optimization step 406.

In step 410, a determination is made as to whether or not there are additional records to process. If there are additional records, the process returns to step 400 to obtain the additional records to consider for sampling. Otherwise, the process ends as indicated.

As in the case of the FIG. 3 process, once appropriate samples of a given set of records have been generated using the FIG. 4 process, the samples may be stored in the sample database 114 or elsewhere in the system 100, and used to perform regression analysis, data mining or other functions. Such functions are examples of ways in which results of the sample operations may be further processed to generate information characterizing a database that comprises the sub-groups of records.

In many practical applications, records are usually arriving sequentially and N can be extremely large. Therefore, one can apply the optimal process of FIG. 4 periodically to obtain samples and then merge those samples with one or more previous samples obtained using the sequential process of FIG. 3. Thus, other embodiments of the present invention may combine the sequential and optimal sampling processes of FIGS. 3 and 4, or portions of such processes.

Performance simulations of the sampling processes of FIGS. 3 and 4 will now be described. In these simulations, the performance is a function of the sampling rate p and the record sub-group matrix A. We use a parameter $r\in(0,1)$ to characterize the correlation between two sub-groups, where each entry $A_{ij}$ of the matrix A is generated as an independent Bernoulli random number, i.e., $P(A_{ij}=1)=r$. The sub-groups are then determined by the entries of A that take value 1. The size of each sub-group has an expectation of $m=nr$, and two sub-groups have an expected number of overlapping records equal to $nr^2=mr$. The cosine correlation between two sub-groups is therefore about r. When r=0, the sub-groups are mutually exclusive, and when r is close to 1, each pair of sub-groups has many overlapping records. However, the expected number of overlapping records among k different sub-groups is $nr^k$, which decays exponentially as k grows.

Figure 6:
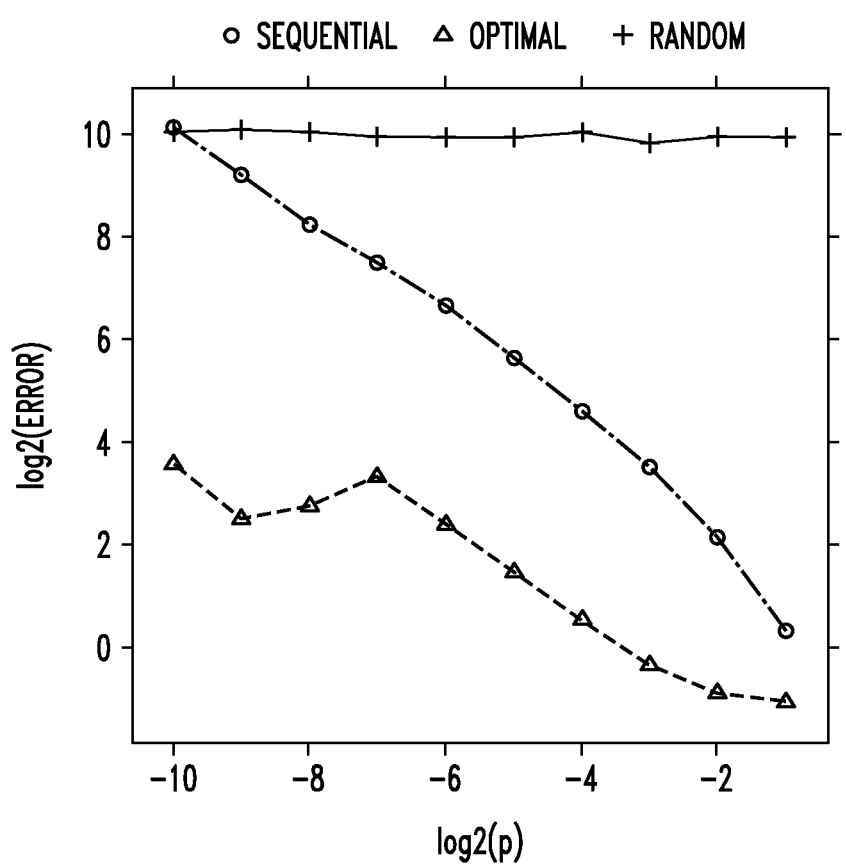
FIG. 6 is a set of plots comparing estimation error as a function of sampling rate for sequential and optimal high-dimensional stratified sampling with that of conventional random sampling.

FIG. 6 shows a set of plots a comparing estimation error as a function of sampling rate p for sequential and optimal high-dimensional stratified sampling with that of conventional random sampling. In these plots, $n=10^6$, J=10000, r=0.001, and p varies from 0.001 to 0.5. It can be seen from the plots that the estimation error for conventional random sampling is invariant to the sampling rate. However, the estimation error for both sequential and optimal high dimensional stratified sampling is much better than that of random sampling except for extremely small sampling rates. Furthermore, the estimation error for both sequential and optimal high dimensional stratified sampling decreases quickly as the sampling rate grows, slightly faster than linear to $p^{-1}$. It can also be seen that the optimal sampling performs uniformly better than the sequential sampling, especially for small sampling rates.

Figure 7:
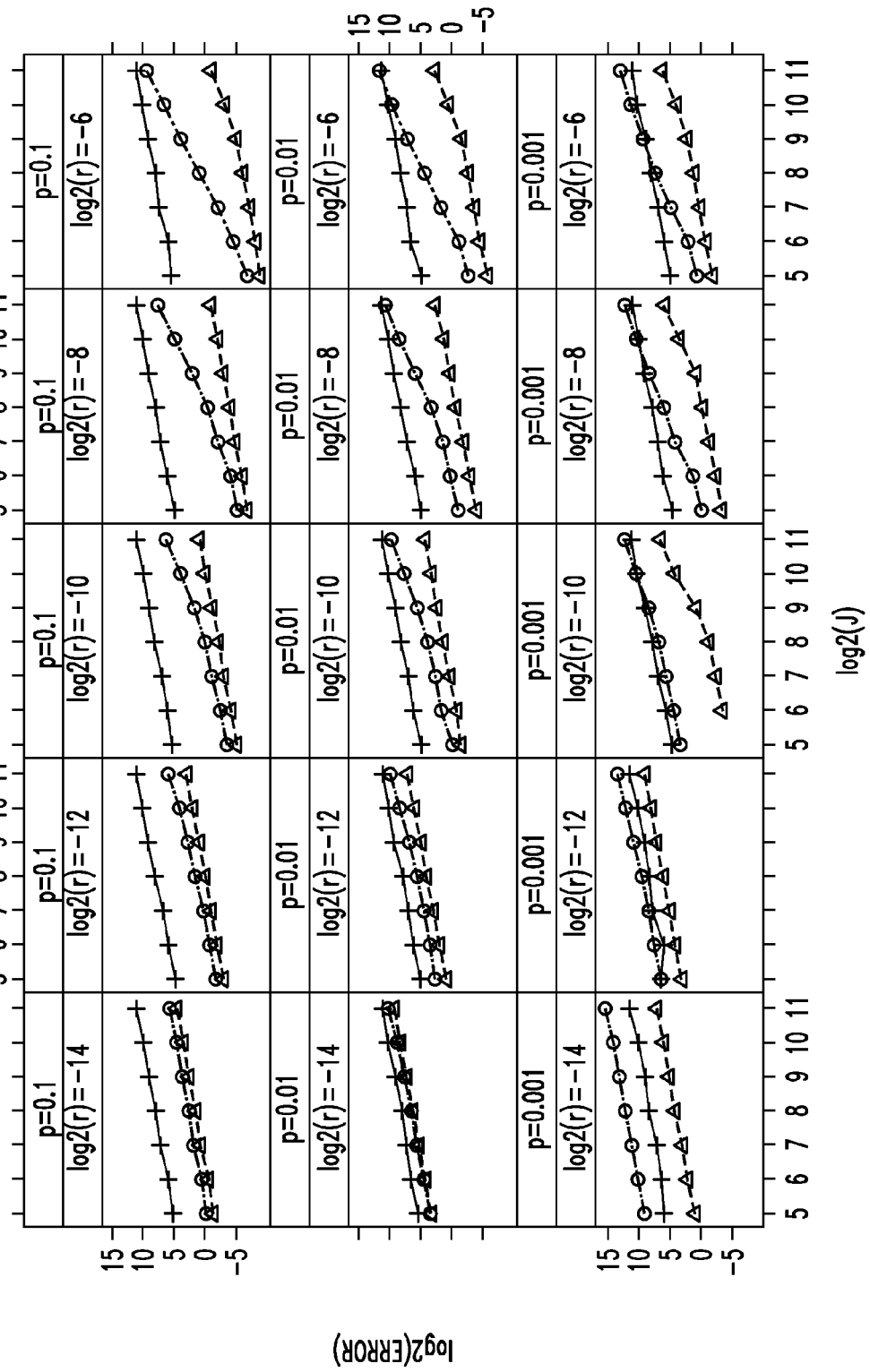
FIG. 7 shows multiple sets of plots each comparing estimation error as a function of the number of sub-groups for sequential and optimal high-dimensional stratified sampling with that of conventional random sampling.

FIG. 7 shows multiple sets of plots comparing estimation error as a function of number of sub-groups J for sequential and optimal high-dimensional stratified sampling with that of conventional random sampling. In these plots, $n=10^6$, p varies from 0.001 to 0.1 and r varies from $2^{-14}$ to $2^{-6}$, which corresponds to sub-group sizes from below 100 to 20,000. It can be seen that the estimation error of both random sampling and optimal sampling increase almost linearly with J, with a slope of almost 1 in the logarithmic scale, in all cases, while sequential sampling has a slightly larger slope, i.e., it decays faster than the other two when J grows. In all cases except when both p and r are small, there is a significant error reduction from random sampling to optimal sampling. The performance of sequential sampling is typically better than random sampling but worse than optimal sampling except when both p and r are very small, or when J is large.

As indicated previously, the high-dimensional stratified sampling techniques disclosed herein can be implemented in a wide variety of applications. For example, these techniques may be used in database query and maintenance applications involving connection records that are generated for each call in a wireless network. A connection record database in such a network may include hundreds of attributes. The database needs to be updated periodically as new records arrive at a rate on the order of millions per day. Typically, one cannot keep records in the database for a long time due to the high volume. Therefore, it is beneficial to have a sample database that can cover a longer history (e.g., a few months) of the records and also be representative of a complete database. In such an application, it may be desirable to sample the records such that connections made in each time interval (e.g., 5 minute intervals) and each location (e.g., sectors of a city) are represented, and each category of failed connections is sampled based on their proportion in the complete records. The sample records should also be representative of factors that are correlated with root causes of call failures, such as types of session setup, signal features in the session setup stage, signal features in the established connection stage, traffic volume, number of pilots, and so on. It is also important to represent the correlation among multiple factors, such as records that indicate connection failure but also strong signal strength and proximity to primary base station. Combinations of these variables can result in tens of thousands of overlapping sub-groups. Other exemplary applications include efficient processing of queries to specified data cubes with bounded precision, and generating unbiased samples in opinion polls drawn from large populations.

The sequential and optimal high-dimensional stratified sampling processes in the illustrative embodiments described above can be used to generate reliable samples with minimal computing and memory requirements. This allows the efficient integration of different sources of information and produces affordable samples, when either the full record set is not possible to access (e.g., in opinion poll we cannot collect information from all customers), or the full record set is too large thus the system cannot afford to give precise answers for all queries (e.g., large integrated databases or network data). The resulting samples are approximately unbiased and permit accurate post-analysis.

As indicated previously, embodiments of the present invention may be implemented at least in part in the form of one or more software programs that are stored in a memory or other computer-readable medium of a processing device of an information processing system. System components such as the modules 210, 212, 214 and 215 may be implemented at least in part using software programs. Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), ASICs, digital signal processors or other types of integrated circuit devices, in any combination. Such integrated circuit devices, as well as portions or combinations thereof, are examples of "circuitry" as the latter term is used herein.

It should again be emphasized that the embodiments described above are for purposes of illustration only, and should not be interpreted as limiting in any way. Other embodiments may use different types and arrangements of system components depending on the needs of the particular stratified sampling application. Alternative embodiments may therefore utilize the techniques described herein in other contexts in which it is desirable to implement accurate and efficient sampling for sets of records. Also, it should also be noted that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
a processing device comprising a processor having an associated memory;
wherein the processing device is operative:
to optimize an objective function characterizing which of a plurality of records in overlapping sub-groups of records are to be sampled, by iteratively updating components of a binary indicator that specifies whether or not respective ones of the plurality of records are sampled; and
to sample particular ones of the plurality of records based on values of the updated components of the binary indicator which optimize the objective function;
wherein samples resulting from the sample operation are processed to generate information characterizing a database comprising the sub-groups of records; and
wherein each of the components of the binary indicator characterizes a corresponding one of the plurality of records;
wherein at least one of the plurality of records is associated with two or more sub-groups.

2. The apparatus of claim 1 wherein the objective function is based on a binomial-normal approximation of a likelihood function of the sampled records.

3. The apparatus of claim 2 wherein the binary indicator is given by $c \in \{0,1\}^N$ with $\Sigma_{i=1}^N c_i = n$ such that $c_i$ indicates whether the ith record is sampled, where N denotes the number of records in the plurality of records, and n denotes the number of sampled records in the N records.

4. The apparatus of claim 3 wherein the objection function is based on an N×J sparse binary matrix A, where a particular entry $A_{ij}$ in the matrix A indicates whether or not the ith record is part of the jth sub-group, i=1, ..., N, j=1, ..., J, and said optimization utilizes sparse matrix operations performed on A.

5. The apparatus of claim 4 wherein the likelihood function of the sampled records is given by:

$$\prod_{j=1}^{J} \binom{n_j}{s_j} p^{s_j}(1-p)^{n_j-s_j}$$

and the corresponding binomial-normal approximation is given by:

$$\sum_j \frac{(s_j - n_j p)^2}{n_j p(1-p)},$$

and wherein $$n_j = \sum_{i=1}^{N} A_{ij}$$

$$s_j = \sum_{i=1}^{N} c_i A_{ij}$$

denote number of records for the jth sub-group and number of sampled records for the jth sub-group, respectively, and p denotes sampling rate.

6. The apparatus of claim 5 wherein the objective function is given by $$L(c) = \sum_j \frac{(A_j^T c - n_j p)^2}{n_j p(1-p)}$$

and the objective function is optimized by minimizing L(c) with respect to c.

7. The apparatus of claim 1 wherein the processing device comprises a controller having a sampling module configured to perform said optimize and sample operations.

8. An integrated circuit comprising the apparatus of claim 1.

9. A processor-implemented method comprising steps of:
optimizing an objective function characterizing which of a plurality of records in overlapping sub-groups of records are to be sampled, by iteratively updating components of a binary indicator that specifies whether or not respective ones of the plurality of records are sampled;
sampling particular ones of the plurality of records based on values of the updated components of the binary indicator which optimize the objective function; and
processing samples resulting from the sampling step to generate information characterizing a database comprising the plurality of records;
wherein each of the components of the binary indicator characterizes a corresponding one of the plurality of records;
wherein at least one of the plurality of records is associated with two or more sub-groups.

10. An article of manufacture comprising a non-transitory computer-readable storage medium having embodied therein executable program code that when executed by a processor of a processing device causes the device to perform the steps of the method of claim 9.

11. The method of claim 9 wherein the objective function is based on a binomial-normal approximation of a likelihood function of the sampled records.

12. The method of claim 11 wherein the binary indicator is given by $c \in \{0,1\}^N$ with $\Sigma_{i=1}^N c_i = n$ such that $c_i$ indicates whether the ith record is sampled, where N denotes the number of records in the plurality of records, and n denotes the number of sampled records in the N records.

13. The method of claim 12 wherein the objection function is based on an N×J sparse binary matrix A, where a particular entry $A_{ij}$ in the matrix A indicates whether or not the ith record is part of the jth sub-group, i=1, ..., N, j=1, ..., J, and said optimization utilizes sparse matrix operations performed on A.

14. The method of claim 13 wherein the likelihood function of the sampled records is given by:

$$\prod_{j=1}^{J} \binom{n_j}{s_j} p^{s_j}(1-p)^{n_j-s_j}$$

and the corresponding binomial-normal approximation is given by:

$$\sum_j \frac{(s_j - n_j p)^2}{n_j p(1-p)},$$

and wherein $$n_j = \sum_{i=1}^{N} A_{ij}$$

$$s_j = \sum_{i=1}^{N} c_i A_{ij}$$

denote number of records for the jth sub-group and number of sampled records for the jth sub-group, respectively, and p denotes sampling rate.

15. The method of claim 14 wherein the objective function is given by $$L(c) = \sum_j \frac{(A_j^T c - n_j p)^2}{n_j p(1-p)}$$

and the objective function is optimized by minimizing L(c) with respect to c.

16. The method of claim 9 wherein said optimizing and said sampling steps are performed in a sampling module of a processing device.

* * * * *